Feb. 28, 1928.
A. W. HICKS
1,660,752
VALVE STEM CAP AND TIRE LOCK
Filed July 19, 1926
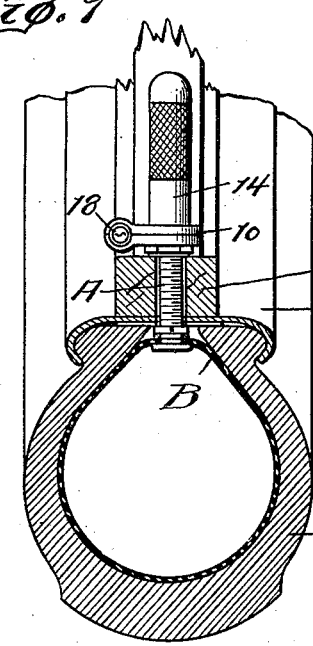
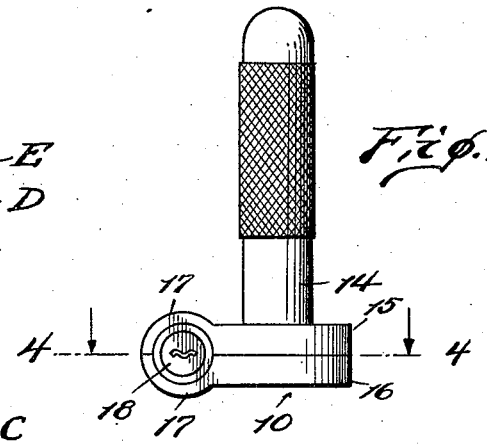
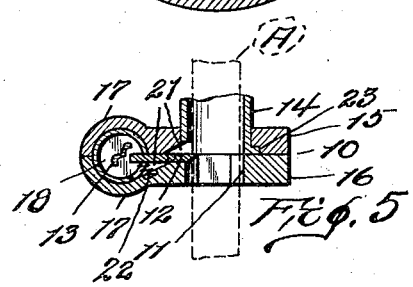
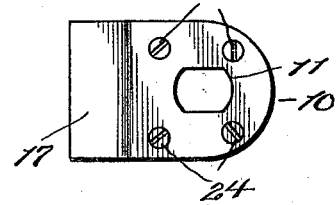
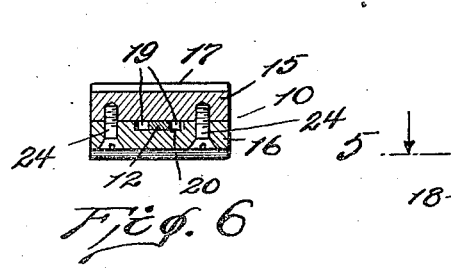
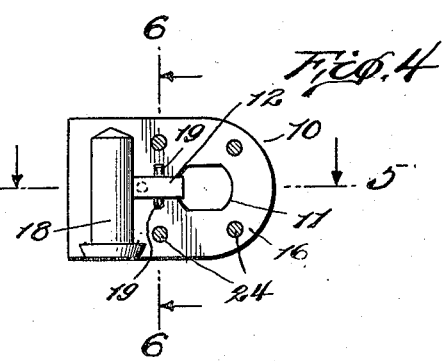
INVENTOR
ARCHIE W. HICKS,
by R. S. Berry
ATTORNEY.

Patented Feb. 28, 1928.

1,660,752

UNITED STATES PATENT OFFICE.

ARCHIE W. HICKS, OF PASADENA, CALIFORNIA.

VALVE-STEM CAP AND TIRE LOCK.

Application filed July 19, 1926. Serial No. 123,295.

This invention relates to improvements in automobile tire locks, and more particularly to a key operated lock for connection with the valve stem of a mounted pneumatic tire.

Among the objects of my invention is to provide a lock of simple, durable and inexpensive construction comprising a key actuated element for engagement with the stem of a mounted tire whereby unauthorized removal of the tire is prevented, and a further object is to provide such a lock with a cover for the valve stem cap whereby to prevent unauthorized deflation of the tire and theft of the valve cap. Another object is to provide for the lock an improved locking bolt in which friction is reduced and danger of becoming rust-tight obviated by reason of the bolt having a pivotal, rather than a sliding movement.

My improvements consist in the novel construction, arrangement and combination of parts as hereinafter fully, clearly and concisely described, definitely pointed out in my claims and illustrated by the accompanying drawing (1 sheet) in which—

Fig. 1 shows a transverse sectional elevation of a mounted tire with a lock of my invention as securing the same against unauthorized removal of the tire and unauthorized acess to the valve cap.

Fig. 2 is an elevation of the lock.

Fig. 3 is an inverted plan view of the lock.

Fig. 4 is a sectional plan view taken on the line 4—4 of Fig. 2.

Fig. 5 is a sectional elevation taken on the line 5—5 of Fig. 4, the valve stem being shown by dotted lines and the cover therefor being shown fragmentarily.

Fig. 6 is a section taken on the line 6—6 of Fig. 4.

Referring more specifically to the drawing A designates the valve stem, B the inner tube, C the casing, D the rim, and E the felly all of which are or may be of standard, conventional construction and of themselves form no part of my invention.

The lock of my invention comprises a body, or casing 10, through which a hole 11 is formed to receive the stem A, a bolt 12 for locking engagement with the stem A and a key 13 for releasing the bolt from the stem A.

By preference I provide with the tire lock, a housing, for covering the valve stem, in the form of a tubular cap 14, having an open end secured to the lock body in line with the hole 11 therein and having its opposite, free end closed.

By further preference the lock body 10 is in the form of upper and lower plates 15 and 16, of identical contour and formed as by stamping, with the hole 11 extended through both plates, and each plate is shaped as at 17 to form a seat for a key lock of the barrel type as shown at 18. The bolt 12 is of the pivoted type, having trunnions 19 and the bolt with its trunnions is rested in a depression 21 formed in the upper face of the plate 16 (as shown in Fig. 5). In order to provide for the rocking movement of the bolt clearances 21 are formed in both plates and to hold the bolt in normal, or locking position I provide an extensile coil spring 22.

The bolt 12 has its one end formed as a chisel edge for locking engagement with the threads of the valve stem and such end projects in the hole 11 of the lock casing while at its other end the bolt extends through the barrel 18 into the path of the key 13, as best shown in Fig. 5.

As shown in Fig. 5 the hole 11 in the plate 15 is shaped to conform with the section of the tubular valve cap 14 and said cap is secured by providing a foot flange 23, on the cap and a countersink in the plate and the described clearance 21 is continued through the base of the cap.

For convenience in assemblage the plates are relatively separably joined as by the screws 24.

By reason of the extension of the valve stem through the felly, when the device of my invention is locked to the stem it will be obvious that the valve stem cannot be drawn through the felly except by use of a key and it will be further obvious that by reason of the locked cover for the valve cap tampering with and theft of the valve cap is prevented.

I claim:—

1. A lock of the class described comprising a body having an opening formed therethrough adapted to fit non-rotatably around the valve stem of a pneumatic tire, a flat bolt encased in said body, said bolt having a chisel edge at one end and being pivotally mounted between its ends on trunnions which extend transversely to the axis of said opening, to permit swinging of said edge into and out of engagement with the threads of the valve stem, a yielding pressure device normally to hold said bolt in locking position, key-actuated means for said bolt, and a tubular cap having an open end secured to said body.

2. A lock of the class described, comprising a body formed of separably joined parts, and having an opening therethrough whereby it may be fitted over a valve stem, a bolt encased in said body, said bolt consisting of a tilting member having at one end a chisel edge adapted to swing lengthwise of the valve stem into and out of engagement with the threaded portion of the valve stem to prevent endwise movement of said stem with relation to said bolt, a spring for normally holding the bolt in locking position, key actuating means for moving the bolt to unlocking position and a tubular cap secured to the body in line with the opening therein.

3. A lock of the class described comprising a body having an opening formed therethrough adapted to fit non-rotatably around the valve stem of a pneumatic tire, a flat bolt encased in said body, said bolt having a thin edge at one end to engage the threaded portion of the valve stem, and a trunnion projecting from each side edge thereof whereby said bolt is mounted to rock or tilt in a flatwise manner, the end of said bolt opposite to said thin edge being engageable with a key in order to rock said bolt on its trunnions in a plane which aligns with the axis of the valve stem.

In testimony whereof, I have affixed my signature.

ARCHIE W. HICKS.